(12) United States Patent
Foley et al.

(10) Patent No.: US 8,191,474 B2
(45) Date of Patent: Jun. 5, 2012

(54) DEVICE AND METHODS FOR IDENTIFYING MODULES IN A GRAPHICS MACHINE

(75) Inventors: Keith Edwards Foley, Northwood, NH (US); Glenn Alan Guaraldi, Kingston, NH (US); Craig Steven Harris, Durham, NH (US)

(73) Assignee: Goss International Americas, Inc., Durham, NH (US)

( * ) Notice: Subject to any disclaimer, the term of this patent is extended or adjusted under 35 U.S.C. 154(b) by 90 days.

(21) Appl. No.: 12/387,264

(22) Filed: Apr. 30, 2009

(65) Prior Publication Data

US 2009/0211479 A1   Aug. 27, 2009

Related U.S. Application Data

(63) Continuation of application No. 10/796,671, filed on Mar. 9, 2004, now Pat. No. 7,533,611.

(60) Provisional application No. 60/453,356, filed on Mar. 10, 2003.

(51) Int. Cl.
*B41F 33/00* (2006.01)
(52) U.S. Cl. .................... 101/480; 101/494
(58) Field of Classification Search .......... 101/480, 101/494
See application file for complete search history.

(56) References Cited

U.S. PATENT DOCUMENTS

| 633,538 | A | 9/1899 | Waterman et al. |
|---|---|---|---|
| 3,898,557 | A | 8/1975 | Strock |
| 4,166,242 | A | 8/1979 | Spiteri |
| 4,360,870 | A | 11/1982 | McVey |
| 4,730,251 | A | 3/1988 | Aakre et al. |
| 4,796,196 | A | 1/1989 | Durst et al. |
| 4,989,852 | A * | 2/1991 | Gunther, Jr. ............ 270/56 |
| 5,031,115 | A | 7/1991 | Hayashi |
| 5,049,871 | A | 9/1991 | Sturgis et al. |
| 5,099,212 | A | 3/1992 | Nagaishi |
| 5,233,346 | A | 8/1993 | Minerd et al. |
| 5,279,217 | A | 1/1994 | Ueda et al. ............. 101/2 |
| 5,347,265 | A | 9/1994 | Shimura |

(Continued)

FOREIGN PATENT DOCUMENTS

DE    100 270 06    12/2001

(Continued)

OTHER PUBLICATIONS

Chambers Dictionary of Science and Technology, Peter Walker, 1999, p. 751.

(Continued)

*Primary Examiner* — Daniel J Colilla
(74) *Attorney, Agent, or Firm* — Davidson, Davidson & Kappel, LLC

(57) ABSTRACT

A method for detecting a type of one of plurality of devices attached to a graphics machine, each device being one of at least a first type and a second type. The method includes detecting at a controller the type of device attached to or to be attached to the machine. The controller is capable of preadjusting the device or machine as a function of the detection. A graphics machine includes a controller, a first device connected to the controller, the first device being categorizable as one of at least a first type and a second type, the controller detecting the type of the first device, and a memory accessible by the controller, the memory storing information regarding the first type and the second type.

22 Claims, 4 Drawing Sheets

U.S. PATENT DOCUMENTS

| | | | |
|---|---|---|---|
| 5,365,587 A | 11/1994 | Campbell et al. | |
| 5,371,897 A | 12/1994 | Brown et al. | |
| 5,408,229 A | 4/1995 | Yabusaki et al. | |
| 5,432,440 A | 7/1995 | Bartlett | |
| 5,483,893 A | 1/1996 | Isaac et al. | |
| 5,484,214 A | 1/1996 | Ueda et al. | |
| 5,551,053 A | 8/1996 | Nadolski et al. | |
| 5,576,698 A | 11/1996 | Card et al. | |
| 5,581,261 A | 12/1996 | Hickman et al. | |
| 5,592,881 A | 1/1997 | Rabjohns | |
| 5,629,775 A | 5/1997 | Platteter et al. | |
| 5,690,435 A | 11/1997 | Ueda et al. | |
| 5,764,369 A | 6/1998 | Farrell et al. | |
| 5,787,246 A | 7/1998 | Lichtman et al. | |
| 5,831,546 A | 11/1998 | Costa et al. | |
| 5,920,267 A | 7/1999 | Tattersall et al. | |
| 5,934,610 A | 8/1999 | Karolys et al. | |
| 5,948,073 A | 9/1999 | Chapin et al. | |
| 6,124,716 A | 9/2000 | Kanamori | |
| 6,137,591 A | 10/2000 | Kikinis | |
| 6,138,182 A * | 10/2000 | Hennessy et al. | 710/16 |
| 6,166,653 A | 12/2000 | Schulmeyer et al. | |
| 6,267,366 B1 | 7/2001 | Graushar et al. | |
| 6,336,113 B1 | 1/2002 | Yoneda | |
| 6,373,932 B2 | 4/2002 | Bakshi et al. | |
| 6,405,287 B1 | 6/2002 | Lesartre | |
| 6,427,167 B1 | 7/2002 | Siedel | |
| 6,452,402 B1 | 9/2002 | Kerai | |
| 6,501,368 B1 | 12/2002 | Wiebe et al. | |
| 6,682,062 B2 | 1/2004 | Graushar et al. | |
| 6,711,461 B2 | 3/2004 | Flores | |
| 7,391,334 B2 | 6/2008 | Miyake et al. | |
| 7,444,936 B2 | 11/2008 | Foley et al. | |
| 2001/0011219 A1 | 8/2001 | Okano | |
| 2002/0016652 A1 | 2/2002 | Heckmann et al. | 701/1 |
| 2002/0096942 A1 | 7/2002 | Goers et al. | |
| 2004/0101133 A1 | 5/2004 | Le et al. | |
| 2004/0111597 A1 | 6/2004 | Rothman et al. | |

FOREIGN PATENT DOCUMENTS

| | | |
|---|---|---|
| DE | 103 10 413 | 10/2003 |
| EP | 03 04 574 | 3/1989 |
| EP | 0688674 A2 | 12/1995 |
| FR | 2707116 A1 * | 1/1995 |
| JP | 60 027 988 | 2/1985 |
| JP | 64-51277 | 2/1989 |
| JP | 03139128 A | 6/1991 |
| JP | 5-318899 | 12/1993 |
| JP | 2002-73113 | 3/2002 |
| JP | 2002-79652 | 3/2002 |
| JP | 2004-167806 | 6/2004 |
| WO | WO 95/30191 A1 | 11/1995 |
| WO | WO 00 77 649 | 12/2000 |

OTHER PUBLICATIONS

Pepperl+Fuchs, IPT-FP with U-P6-B6 Read. Write Station with PROFIBUS-DP Interface, Manual, Aug. 20, 2000, p. 12.

* cited by examiner

DEVICE AND METHODS FOR IDENTIFYING MODULES IN A GRAPHICS MACHINE

This is a continuation application of U.S. patent application Ser. No. 10/796,671 filed Mar. 9, 2004, which claims priority to U.S. Provisional Patent Application No. 60/453,356, filed Mar. 10, 2003; all are hereby incorporated by reference herein.

BACKGROUND INFORMATION

The present invention relates to a device and method for identifying modules used in graphics industry machines, such as folders, gatherers, printing presses and stitchers.

U.S. Pat. No. 6,166,653 discloses a system for address initialization of generic nodes in a distributed command and control system for a transportation system and a related method. A distance is determined from the control unit to each node and a specific address is assigned to the node based on the relative location of the node.

BRIEF SUMMARY OF THE INVENTION

An object of the present invention is to permit the identification of different devices attached to a graphics machine. "Graphics machine" as defined herein includes any machine used in the graphical industry.

The present invention provides a method for detecting a type of one of plurality of devices attached to a graphics machine, each device being one of at least a first type and a second type, the method comprising: detecting at a controller the type of device attached, to or to be attached, to the machine. The controller can pre-adjust the device or controller as a function of the detection.

Preferably, the device includes a type identifier, and an identifier reader can be connected to the controller.

Preferably, the controller sends a control signal to the device as a function of the detection.

Preferably, the devices can be added or removed and replaced with other devices, i.e. the devices are modules. These modules may be for example hoppers (feeders) for a binding line, such as a saddle back or flatback binding line. These feeders may be for example of different types: horizontal feeders, vertical feeders, cover folder feeders, card feeders, CD inserters, gluepots, numbering units, or print pockets. Other examples of graphics machines are a printing press, a stacker, a trimmer, or a folder. For example, for a printing press a cloth-type blanket washer or brush-type blanket washer could be identified, and thus the controller could identify the type of blanket washer and control that washer accordingly. A type of ink fountain feeder could be identified as well, for example an anilox inker. For a folder, different types of cutoff controls or silicon applicators could be identified.

The machine preferably may run a self-test check upon each turn-on of the machine to determine which devices are connected to the machine.

The present invention also provides a graphics machine comprising: a controller; a first device connected to the controller, the first device being categorizable as one of at least a first type and a second type, the controller detecting the type of the first device; and a memory accessible by the controller, the memory storing information regarding the first type and the second type.

Preferably, the first device includes a type identifier, and the machine further comprises an identifier reader connected to the controller.

The controller preferably is capable of automatically adjusting the first device as a function of the information.

Preferably, the information is stored as a table.

The first device may be connected to the controller via an electrical plug, a fixed transmission line or a wireless connection.

Preferably, the graphics machine includes a second device connected to the controller, the second device being one of the first type and the second type.

The first device preferably is modular, i.e. the first device is removably connected to the controller and replaceable by another device which is one of the first type and the second type.

BRIEF DESCRIPTION OF THE DRAWINGS

The present invention is described with reference to the following figures, in which.

DETAILED DESCRIPTION

Figure 1:
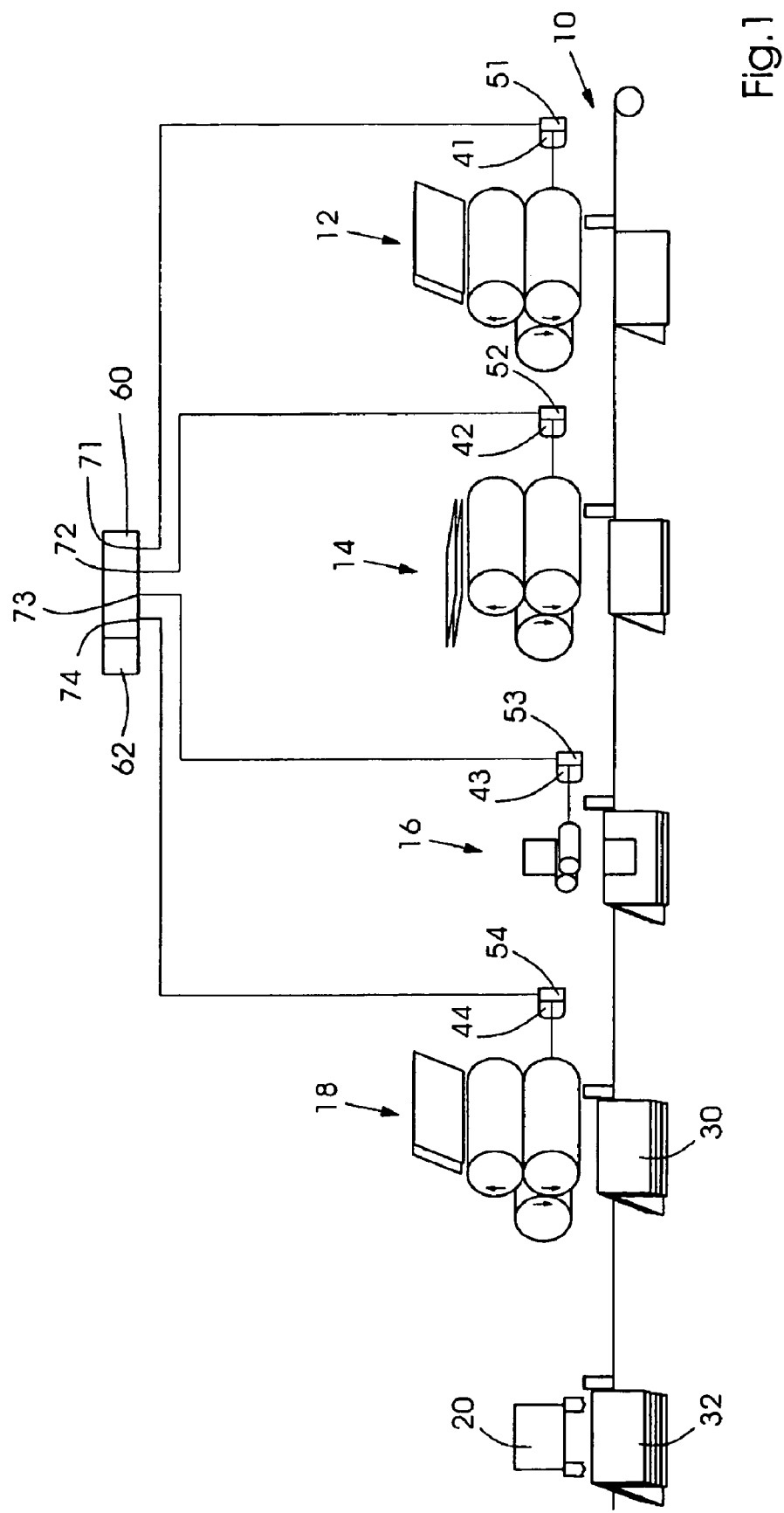
FIG. 1 shows a saddle-back bindery having various modules detected by a controller according to the present invention.

FIG. 1 shows a saddle back conveyor line 10 for collecting printed products, which are then stitched by a stitching device 20. At predefined locations or stations along the conveyor line 10 are feeder modules, which as shown are a vertical feeder 12, a horizontal feeder 14, a card inserter 16 and another vertical feeder 18. These feeder modules feed their respective products to the conveyor line 10 to form a collected printed product 30 which is then stitched by saddle back stitching device 20 to form a finished product 32. While the line has been described with four stations, many more stations may be provided and other types of modules may be included, such as glue pots, numbering units, CD inserters, cover folder feeders, print pockets, blown-in card feeders; hopper loaders, onset feeders, and stackers and trimmers, which would come after the stitching device.

These modules are interchangeable along the line, so that for example card inserter 16 and horizontal feeder 14 might need to be switched for a new printed product configuration.

Each module 12, 14, 16, 18 contains a type identifier 41, 42, 43, 44, respectively to identify the type of module. An identifier reader 51, 52, 53, 54 can determine, in conjunction for example with a processor 60 and a memory 62, the type provided by identifier 41, 42, 43, 44, respectively. Each reader 51, 52, 53, 54 is connected by an input 71, 72, 73, 74, respectively, to the processor 60, for example by a data bus.

Figure 2:
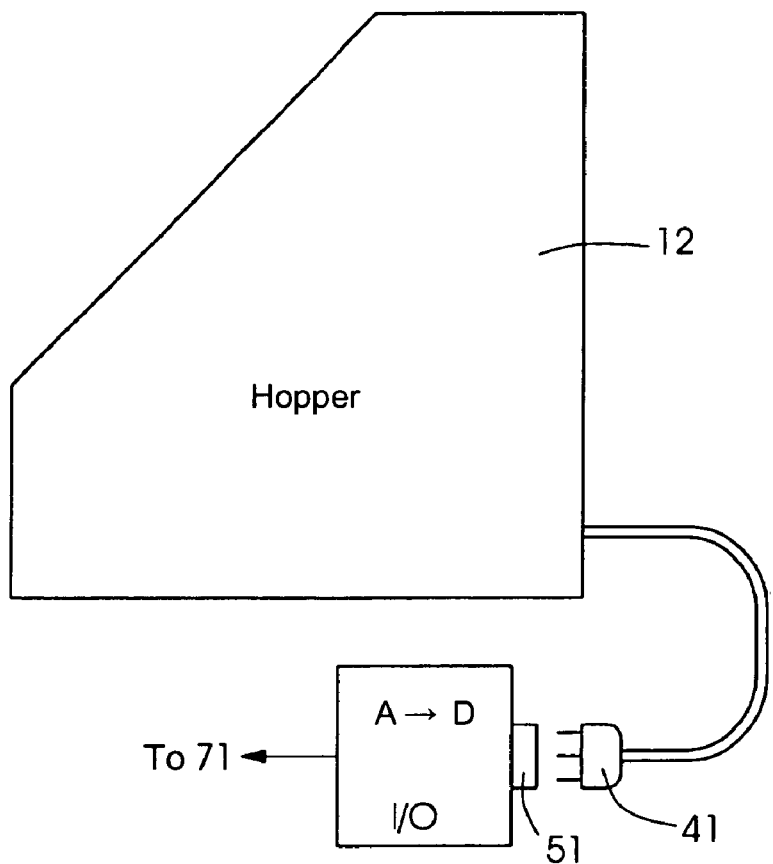
FIG. 2 shows a plug connection for permitting identification of the device type.
Figure 3:
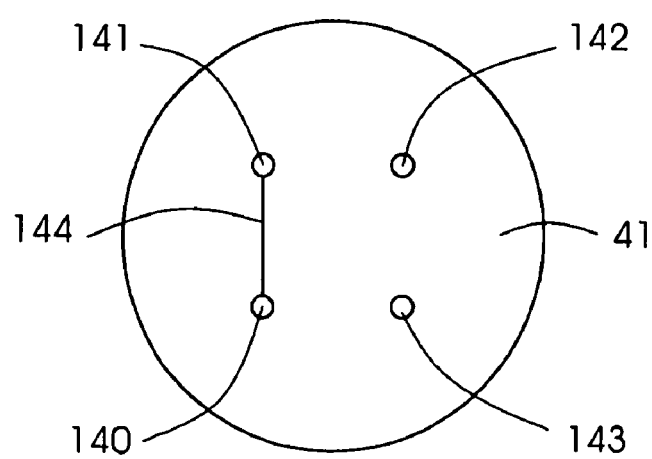
FIG. 3 shows an end view of the plug connection of FIG. 2.

As shown in FIG. 2, type identifier 41 may be a plug with a configuration unique to the type of device, for example a vertical feeder or hopper 12. As shown in FIG. 3, plug 41 may have four pins, 140, 141, 142, 143, with pin 140 providing power from reader 51. Reader 51 provides power to pin 140 at a certain voltage and reads the voltage at each of the other pins 141, 142, 143. Connection from pin 140 to pins 141, 142 and/or 143 in identifier 41 is provided via a connection 144 during a manufacturing of the type identifier 41.

If reader 51 registers a voltage solely at pin 141, the reader 51, which has a D-A converter can send a three-bit digital signal 001 to the processor 60. A table stored in memory 62 can identify 001 as a vertical feeder. The processor 60 then automatically may undertake control steps, for example altering characteristics of a graphical user interface or altering other devices on line 10, or of stitching device 20 as a function of the type of device at the first location on the line 10.

With the four pin configuration of identifier 41, eight different types may be identified. No power read at pins 141, 142 and 143 could identify a horizontal feeder and lead to a 000 output byte, power at pin 141 only a vertical feeder with a 001 output, at pin 142 only a card inserter and a 010 output, at pin 143 only a CD inserter and a 011 output, power at pins 141 and 142 only print pocket inserter and a 100 output, power at pins 141, and 143 only a numbering unit and a 101 output, power at pins 142 and 143 only a gluepot and a 110 output and power at all three pins a blown in card feeder and a 111 output.

Thus memory 62 can contain a database such as a table, with 000 identifying a horizontal feeder, 001 a vertical feeder and so on. Processor 60, which receives the bytes from the readers 51, 52, 53, 54 at known inputs 71, 72, 73, 74 thus knows exactly which type of device is at which location on the line 10.

Alternately, the reader could provide direct inputs from the pins 141, 142, 143 to the processor 60, with an A-D converter for each pin merely providing a zero or one depending on power at the pin and the processor 60 processing the data from each pin 141, 143, 143 directly. In other words, part of the reader 51 functions may be accomplished by the processor 60 and the processor 60 can sense the presence or absence of power on each pin 141, 142, 143.

It should be noted that additional pins or fewer pins may be used, and the pins may be used for other functions as long as the use does not interfere with the identification process.

Figure 4:
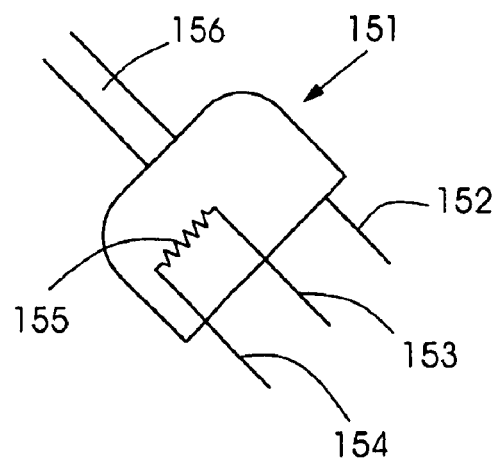
FIG. 4 shows an alternate plug connection.

FIG. 4 shows an alternate type identifier 151 where a pin 151 may be used to provide a control signal or power the module via a cable 156. A reader 153 provides a certain voltage or current at a pin 153, with current flowing through a resistor 155. A voltage or current then is read at a pin 154 by the reader, this read voltage or current being a function of the resistance of the resistor. The reader or processor can convert this read voltage or current through an A-D converter into a unique digital signal, which via information stored in memory 62. Thus for example a plug with a 1000 ohm resistor can identify one type of device, and a plug with a 10K resistor another type of device. A large number of types thus can be identified using different resistance resistors depending on the sensitivity and accuracy of the A-D converter.

Figure 5:
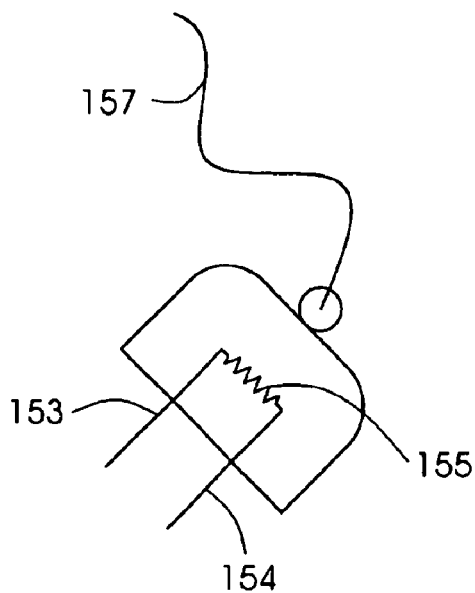
FIG. 5 shows yet another alternate plug connection.

FIG. 5 shows the same type identifier as in FIG. 4, without the extra pin 152. In this embodiment, the type identifier need not be connected electrically to the module, and may simple be attached by a chain 157, for example.

However, pin 152 may be advantageous for example to send a control signal back to the module, for example to preadjust the module depending on the type of module connected on line 10.

Controller 60 also can perform a self test at each start up of the line 10 to identify the components on line 10.

Figure 6:
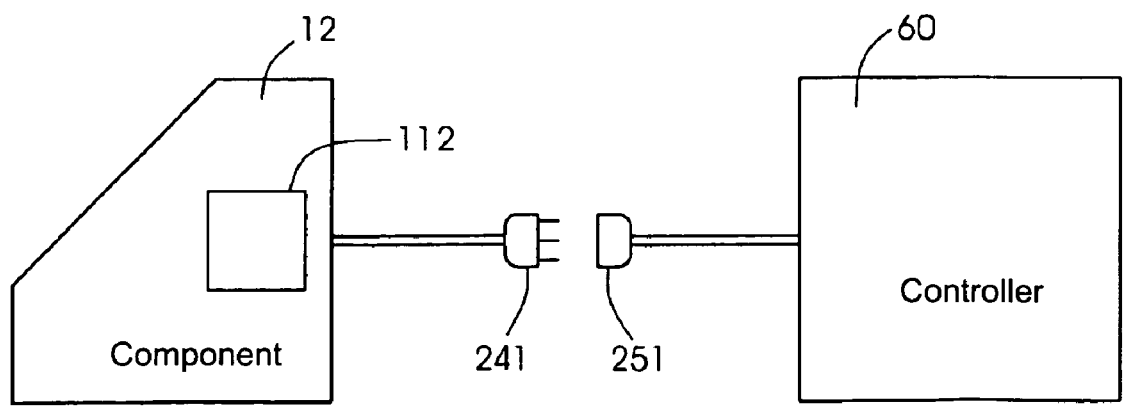
FIG. 6 shows an alternate embodiment with the device having a voltage source.

FIG. 6 shows an alternate embodiment in which the module 12 has a voltage source 112 connected to a type identifier 141. The voltage source 112 provides a unique voltage depending on the type of module 12 to a pin at identifier 241. The voltage which is read by reader 251 and sent to processor 60. For example 5 volts could indicate a vertical hopper, while 10 volts indicates a horizontal hopper, and this information is stored in memory 62. The number of types of modules which then can be uniquely identified is a function of the range of voltage and sensitivity of an A-D converter.

Figure 7:
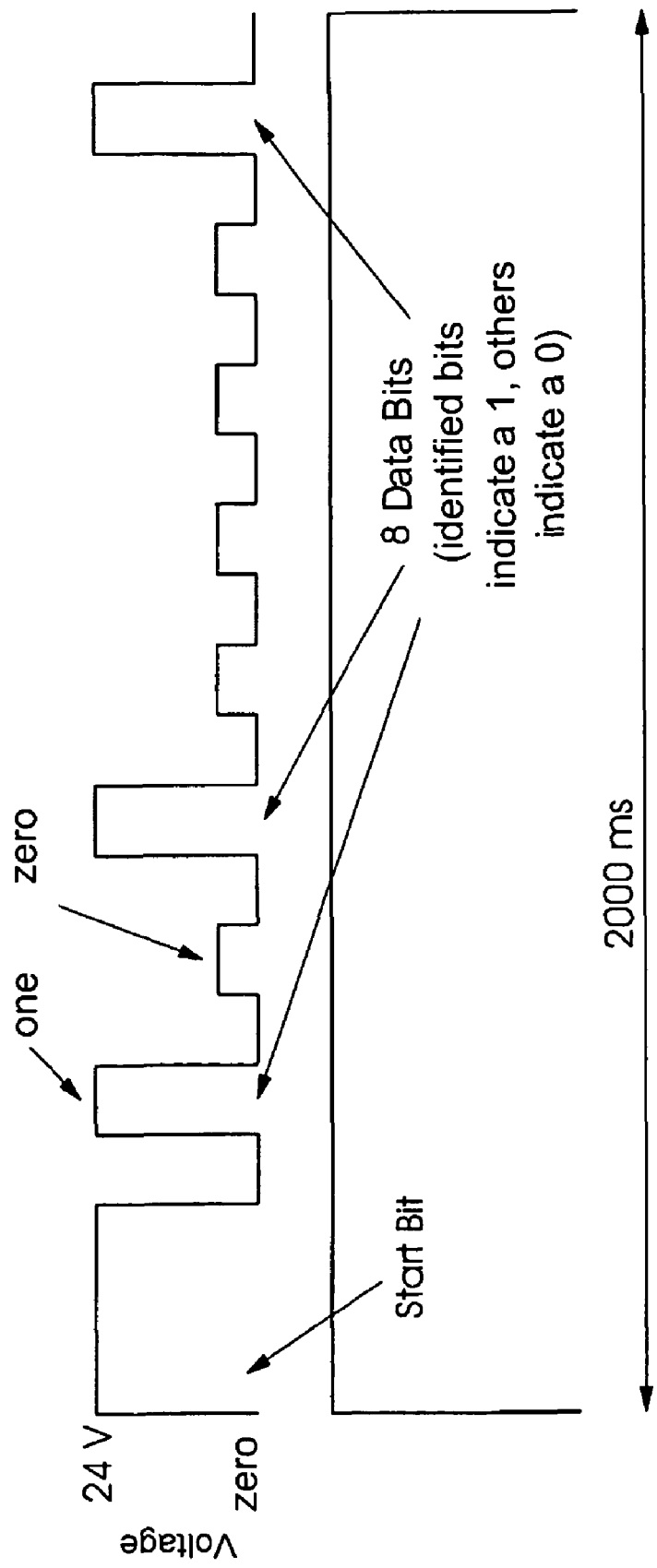
FIG. 7 shows a digital signal generated in another embodiment of the present invention.

FIG. 7 shows yet another alternate embodiment in which the type identifier provides a unique digital signal, provided via a plug with a pin for the signal and one for ground and one for power, if the module does not provide power. The signal may be sent to each digital input of the processor 60. For example, the signal may be provided continuously to the processor 60, so that presence of the module on line 10 is always recognized, and also accidental removal of the module 10 can also be recognized.

FIG. 7 shows an example of a 2 second signal sent by a chip provided at the module 12. A start bit is provided for the first continuous 400 milliseconds to identify the start of the signal, and then 8 data bits are sent, thus providing for an eight byte word capable of identifying 255 unique types of modules. The bits are of 100 millisecond duration followed by a 100 millisecond space. The signal may be a 24 dc volt signal, with 24 volts indicating an on and zero or less than a certain voltage below 24 volts indicating volts an off.

Additional bytes could be provided to identify the location of the module on the line, if each location did not provide a unique input to the controller or processor 60, and thus a multiplexed signal could be provided to a single input at processor 60.

The value of the byte would be used via a table in memory 62 to identify the type of module.

It should be noted that based on the type, the value of pile overload switches, sensors, or inhibit selective modes may be identified or controlled by controller 60, and all of this information may be stored in memory 62.

The type identifier alternately may include a timer chip which would supply a digital signal of unique time duration based on the type of module. The timer chip thus has a clock pulse combined with a counting circuit. The duration of the digital signal may then be identified by processor 60 to determine the type of device. For example, a duration of 200 milliseconds could identify a vertical hopper and a duration of 400 milliseconds a horizontal hopper.

The type identifier alternately may be a tag read by an inductive field as the module is mounted on the machine. Such a device is manufactured for example by Pepperl and Fuchs (www.pepperl-fuchs.com) and consists of a read-write head and tags. The tags are powered up as they pass the read-write head of the reader and send back up to 1 k bytes of data. The tags also can be written to by the read-write head to provide the type identification.

The present invention thus allows proper machine control of the modules, and proper motion control. The method of the present invention permits the controller to deterministically identify the presence and type of a particular module. Controller 60 may be an Intel-based processor for example or a PLC.

What is claimed is:

1. A method for detecting a type of one of a plurality of devices attached to a graphics machine, each device being one of at least a first type and a second type, the method comprising:

measuring at least one signal based on a type identifier of a first device of the plurality of devices; and detecting at a first known input of a controller whether the first device attached to the machine is of the first type or the second type by comparing the at least one signal to stored signal values corresponding to the first type and the second type, the controller being capable of preadjusting the first device as a function of the detection, the first known input corresponding to a location of the machine;

wherein the controller has a plurality of known inputs, each input identifying a particular location of the machine.

2. The method as recited in claim 1 wherein the first device includes an identifier reader connected to the controller, the identifier reader reading the type identifier and providing the unique signal to the controller.

3. The method as recited in claim 1 wherein the controller sends a control signal to the first device as a function of the detection.

4. The method as recited in claim 1 wherein the devices can be added or removed and replaced with other devices of other types.

5. The method as recited in claim 1 wherein the devices are feeders for a binding line.

6. The method as recited in claim 1 wherein the devices are printing press components.

7. The method as recited in claim 1 further comprising running a self-test check upon each turn-on of the machine to determine which devices are connected to the machine.

8. A graphics machine comprising:
- a controller having a plurality of inputs, each input identifying a particular location of the machine;
- a first device connected to the controller at a first of the known inputs, the first device including a type identifier, the first device being a graphics machine component categorizable as one of at least a first type and a second type; and
- a memory accessible by the controller, the memory storing information regarding the first type and the second type, the controller measuring a unique signal based on the type identifier and determining whether the first device is of the first type or the second type by comparing the unique signal to stored signal values corresponding to the first type and the second type.

9. The machine as recited in claim 8 wherein the machine further comprises an identifier reader connected to the controller, the identifier reader reading the type identifier and providing the unique signal to the controller.

10. The machine as recited in claim 9 wherein the type identifier is a plug having an input power pin and at least one other pin, the first type or second type being identified by a connection between the power pin and the other pin.

11. The machine as recited in claim 10 wherein the input power pin and the other pin are separated by a resistor.

12. The machine as recited in claim 10 wherein the at least one other pin includes two other pins, the type being determined by the presence or absence of power at the other pins when power is supplied to the input power pin.

13. The machine as recited in claim 8 wherein the controller automatically adjusts the first device as a function of the information.

14. The machine as recited in claim 13 wherein the type identifier supplies the unique signal as a digital signal to the controller.

15. The machine as recited in claim 8 wherein the information is stored as a table.

16. The machine as recited in claim 8 wherein the first device is connected to the controller via an electrical plug, a fixed transmission line or a wireless connection.

17. The machine as recited in claim 8 wherein the graphics machine includes a second device connected to the controller, the second device being one of the first type and the second type.

18. The machine as recited in claim 8 wherein the first device is modular.

19. The machine as recited in claim 8 wherein the first device is a component of one of a printing press, a stacker, a trimmer, a folder, a gatherer, a binding line and a stitcher.

20. The machine as recited in claim 8 wherein the type identifier is configured for removably connecting the first device to the controller at each of the known inputs such that the type identifier is selectively connectable to or disconnectable from each of the known inputs.

21. The machine as recited in claim 20 wherein the graphics machine includes a plurality of additional devices, each of the plurality of additional devices being a graphics machine component and including a respective type identifier, each of the type identifiers being configured for removably connecting the respective additional device to the controller at each of the known inputs such that each of the type identifiers is selectively connectable to or disconnectable from each of the known inputs.

22. A method for operating a conveyor line for collecting printed products comprising:
- operating a plurality of devices at stations along a conveyor to create a first printed product configuration, the plurality of devices including at least a first feeder feeding a first printed product to the conveyor and a second feeder feeding a second printed product collected with the first printed product, the first feeder being connected to a controller at a first known input identifying a first location of the conveyor line and the second feeder being connected to the controller at a second known input identifying a second location of the conveyor line;
- exchanging one of the plurality of devices with a second device of another type;
- detecting at the controller a type of the second device; and
- operating the conveyor line as a function of the detecting to create a second product configuration different from the first printed product configuration.

* * * * *